US012631732B2

(12) United States Patent (10) Patent No.: US 12,631,732 B2

Mayer et al. (45) Date of Patent: May 19, 2026

(54) MEASURING DEVICE COMPRISING A TARGETING UNIT AND A SCANNING MODULE

(71) Applicant: LEICA GEOSYSTEMS AG, Heerbrugg (CH)

(72) Inventors: Tim Mayer, Widnau (CH); Benjamin Schöll, Hauptwil (CH); Jochen Scheja, Hohenems (AT); Jürg Hinderling, Marbach (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 866 days.

(21) Appl. No.: 17/953,185

(22) Filed: Sep. 26, 2022

(65) Prior Publication Data

US 2023/0096122 A1 Mar. 30, 2023

(30) Foreign Application Priority Data

Sep. 27, 2021 (EP) ..................................... 21199258

(51) Int. Cl.
  G01S 7/481 (2006.01)
  G01S 17/42 (2006.01)
(52) U.S. Cl.
  CPC .......... G01S 7/4817 (2013.01); G01S 7/4814 (2013.01); G01S 17/42 (2013.01)
(58) Field of Classification Search
  CPC ...... G01S 7/4817; G01S 7/4814; G01S 17/42; G01S 7/4816; G01S 17/66; G01S 17/89; G01C 15/002
  See application file for complete search history.

(56) References Cited

U.S. PATENT DOCUMENTS

| | | | |
|---|---|---|---|
| 5,886,340 A | 3/1999 | Suzuki et al. | |
| 5,909,302 A * | 6/1999 | Guissin | G02B 26/105 |
| | | | 250/234 |
| 6,433,858 B1 | 8/2002 | Suzuki | |
| 8,294,769 B2 | 10/2012 | Otani et al. | |
| 8,466,406 B2 * | 6/2013 | Hvass | G01S 5/16 |
| | | | 250/214.1 |
| 9,036,134 B2 * | 5/2015 | Steffey | G01S 7/4808 |
| | | | 356/5.01 |
| 9,057,610 B2 * | 6/2015 | Graesser | G01C 15/002 |

(Continued)

FOREIGN PATENT DOCUMENTS

| | | |
|---|---|---|
| DE | 197 107 22 A1 | 10/1997 |
| DE | 199 267 06 | 12/1999 |

(Continued)

OTHER PUBLICATIONS

Faro Laser Scanner Focus 3D Manual, Feb. 2015 (Year: 2015).*

(Continued)

*Primary Examiner* — Yuqing Xiao
*Assistant Examiner* — Jempson Noel
(74) *Attorney, Agent, or Firm* — Maschoff Brennan

(57) ABSTRACT

A measuring device comprising a targeting unit and a scanning module. The scanning module bas a field of view with a central line in the field of view. The measuring device has a pivoting axis around which an upper part of the measuring device can be pivoted or rotated. The central line deviates by at most 45 degree from orthogonality with respect to the pivoting axis.

19 Claims, 5 Drawing Sheets

(56)  References Cited

U.S. PATENT DOCUMENTS

| | | | | |
|---|---|---|---|---|
| 10,495,756 | B2 * | 12/2019 | Walsh | G02B 26/10 |
| 10,634,496 | B2 * | 4/2020 | Kumagai | G01S 17/08 |
| 2006/0064890 | A1 | 3/2006 | Brandl | |
| 2010/0034421 | A1 * | 2/2010 | Roberts | G01S 19/43 |
| | | | | 382/100 |
| 2012/0229788 | A1 * | 9/2012 | Schumann | G01S 17/89 |
| | | | | 356/4.01 |
| 2015/0029489 | A1 * | 1/2015 | Metzler | G01S 7/4812 |
| | | | | 356/4.01 |
| 2015/0042977 | A1 | 2/2015 | Siercks et al. | |
| 2016/0131745 | A1 * | 5/2016 | Nordenfelt | G01S 17/08 |
| | | | | 356/4.01 |
| 2018/0031677 | A1 | 2/2018 | Yuasa | |
| 2019/0145769 | A1 | 5/2019 | Sasaki et al. | |
| 2019/0170865 | A1 | 6/2019 | Sasaki | |
| 2020/0209394 | A1 * | 7/2020 | Mark | G01S 7/4972 |
| 2022/0146677 | A1 * | 5/2022 | Willett | G01S 17/89 |

FOREIGN PATENT DOCUMENTS

| | | | |
|---|---|---|---|
| DE | 199 495 80 | A1 | 4/2000 |
| EP | 2 141 450 | A1 | 1/2010 |
| EP | 2 219 011 | A1 | 8/2010 |
| EP | 2 620 746 | A1 | 7/2013 |
| JP | 2013-190272 | A | 9/2013 |
| JP | 2017-223608 | A | 12/2017 |
| WO | 97/40342 | A2 | 10/1997 |
| WO | 2004/036145 | A1 | 4/2004 |

OTHER PUBLICATIONS

Extended European Search Report dated Mar. 16, 2022 as received in Application No. 21199258.1.

CN Office Action dated Jan. 21, 2026 as received in Application No. 202211155420.8.

* cited by examiner

MEASURING DEVICE COMPRISING A TARGETING UNIT AND A SCANNING MODULE

BACKGROUND

This disclosure relates to a multifunctional measuring device comprising a targeting unit and a scanning module.

For acquiring objects or surfaces, use is often made of methods which progressively scan and in the process capture the topography of a structure, such as of a building, for example. In this case, such a topography constitutes a continuous sequence of points which describes the surface of the object, or else a corresponding model or a description of the surface. One conventional approach is scanning by means of a laser scanner which in each case acquires the spatial position of a surface point by the distance to the targeted surface point being measured by means of the laser and this measurement being combined with the angle information of the laser emission. From this distance and angle information, the spatial position of the acquired point can be determined and the surface can be continuously measured. In many cases, in parallel with this purely geometrical acquisition of the surface, image capture by means of a camera is also carried out, which, besides the overall visual view, also provides further information, e.g. regarding the surface texture.

In this regard, WO 97/40342, for example, describes a method which captures a topography by means of scanner systems installed in a stationary manner. A fixed installation point is chosen for these systems and serves as a basis for a scanning process brought about by motors. The three-dimensional location information of the respective surface point can be derived via the distance to the measured point, the angular position at the time of the measurement and the known location of the scanning apparatus. In this case, the scanner systems are specifically designed for the task of topography acquisition and scan a surface by movement of the scanner system or by variation of the beam path.

Moreover, scanning functions can be integrated into various other devices as additional functions. WO 2004/036145 discloses, for example, a geodetic measuring device which emits a laser beam for distance measurement. Such measuring devices can likewise be modified for acquiring surfaces in a scanning fashion, or be operated without modification. One example thereof is motorized theodolites, tachymeters or total stations. Geodetic instruments modified by scanning means inside the telescope suffer from disadvantages like small field of view or slow scanning speed. Therein, typically, the telescope of tachymeters or total stations cannot rotate faster than 1 Hz, even regarding a rotation around the faster-elevation axis.

Some laser scanners according to the prior art enable a user to acquire large surfaces and objects with a relatively short time expenditure-depending on a desired point-to-point resolution-completely and, if appropriate, with additional object information, but the accuracy of the point coordinates which can be derived in this case does not satisfy the high geodetic accuracy standards as established for example for modern measuring devices, in particular for total stations, tachymeters or theodolites.

Modern total stations generally have a compact and integrated design, wherein coaxial distance measuring elements and also computing, control and storage units are usually present in a device. Depending on the expansion stage of the total station, motorization of the targeting or sighting device and—in the case of the use of retroreflectors (for instance an all-round prism) as target objects-means for automatic target seeking and tracking can additionally be integrated. As a human-machine interface, the total station can have an electronic display control unit-generally a microprocessor computing unit with electronic data storage means—with display and input means, e.g. a keyboard. The measurement data acquired in an electrical-sensor-based manner are fed to the display control unit, such that the position of the target point can be determined, optically displayed and stored by the display control unit. Total stations known from the prior art can furthermore have a radio data interface for setting up a radio link to external peripheral components such as e.g. a handheld data acquisition device, which can be designed, in particular, as a data logger or field computer. Total stations as known from the prior art may therefore be equipped with a set of wireless modules which enable them to communicate with different types of external unit, e.g. allowing total stations to profitably interact with cloud services.

For sighting or targeting the target point to be measured, geodetic measuring devices of the generic type have a telescopic sighting body, such as e.g. an optical telescope, as sighting and aiming device. The telescopic sighting body is generally rotatable about a vertical axis and about a horizontal tilting axis relative to a base of the measuring device, such that the aiming axis of the optical telescope can be aligned with the point to be measured by pivoting and tilting. The telescopic sighting body for example of a tachymeter or a total station is also equipped with an electronic distance meter whereas the distance to the target is measured by a laser beam. Together with the angles of an azimuth and elevation angle sensor, the polar coordinates of the target point are determined. Modern devices can have, in addition to the optical viewing channel, a camera for sighting and aiming with angular seconds accuracy, said camera being integrated into the telescopic sighting body and being aligned with the aiming axis for example coaxially or in a parallel fashion. The images or image sequences that can be acquired in this case, in particular a live image, can be represented on the display of the display control unit and/or on a display of the peripheral device—such as e.g. the data logger—used for remote control. In this case, the optical system of the sighting device can have a manual focus—for example an adjustment wheel for altering the position of a focusing optical system—or an autofocus, wherein the focus position is altered e.g. by servomotors. By way of example, such a sighting and aiming device of a geodetic measuring device is described in EP 2 219 011. Automatic focusing devices for telescopic sights of geodetic devices are known e.g. from DE 197 107 22, DE 199 267 06 or DE 199 495 80.

Target objects (e.g. geodetic poles or plumb rods with target marks, such as an all-round prism) are targeted by visual aiming on the basis of the optical telescope. Higher graded geodetic total stations typically are equipped with an automatic targeting sensor. Such measuring devices have an automatic target tracking function for prisms or reflective tapes serving as target reflector (ATR: "Automatic Target Recognition"). For this, a further separate ATR light source—e.g. a multimode fiber output, which emits optical radiation having a wavelength in the range of 750 nm to 850 nm—and a specific ATR detector (e.g. CCD or CMOS area sensor) sensitive to said wavelength are conventionally additionally integrated in the telescope. By way of example, EP 2 141 450 describes a measuring device having a function for automatically targeting a retroreflective target and having an automatic target tracking functionality.

Total stations are optimized to different geodetic functionalities such as referencing the instrument to an external coordinate system by precisely recording reference marks in the environment. Having determined such an external coordinate system, all coordinative operations are referenced to this external or global coordinate system. Another main functionality is the stake-out workflow to bring coordinates into the scene, for example to transfer points from a building plan to the construction site. A third important functionality is the self-calibration of the telescopic sighting body: the telescopic sighting body can be transited by 180°, which is a core element for achieving arcsecond accuracy.

With such modern measuring devices, the coordinates of appropriate target points can be determined with a very high geodetic precision. What is disadvantageous in this case, however, is that the measurement of a large-area object or the recording of a surface of a building with all its elements e.g. with a total station means a disproportionately high time expenditure-compared with a measuring process of a laser scanner on the object.

SUMMARY

It is therefore an objective to provide an improved measuring instrument which, besides an instrument-inherent highly precise target point determining possibility, enables a functionality for rapidly acquiring a multiplicity of target points with—relative to multiple precise target point determination—short time expenditure.

This objective is achieved by realizing the features described herein. Features which further develop the disclosure in an alternative or advantageous manner are also described.

The disclosure relates to a measuring device, in particular total station, tachymeter, theodolite or laser tracker. The measuring device comprises: 1) a base, 2) a construction arranged on the base and pivotable or rotatable about a pivoting axis, also termed standing axis or azimuth axis, the construction having a main frame with at least one column, 3) a targeting unit attached to the main frame, wherein the targeting unit is pivotable or rotatable about a targeting unit rotation axis, also termed tilting axis, wherein the targeting unit has at least an emission unit for emitting a first laser beam, said emission unit defining an optical target axis, also termed aiming axis, 4) a first angle measuring functionality for acquiring at least one pivoting angle defined by a relative pivoting position of the construction with respect to the base, 5) a scanning module comprising a) a beam deflection element for deflecting a scanning laser beam, said beam deflection element being rotatable about a rotation axis in a motorized fashion, wherein the rotation axis in a received state is at a defined angle relative to the pivoting axis, and b) a second angle measuring functionality for determining a rotation angle from an angular position of the beam deflection element, wherein the scanning module has a field of view defined by at least the rotation axis and an orientation of the beam deflection element with respect to the rotation axis, which field of view is within a scan surface, wherein the scan surface is in particular embodied as a scan plane, and wherein the deflected scanning laser beam is in the field of view in case the scanning module is within an angular field of view rotation range around the rotation axis, wherein the angular field of view rotation range comprises a central rotation angle, and wherein at the central rotation angle the beam deflection element is configured to deflect the scanning laser beam in a central line direction, and 6) a control and processing unit for data processing and for control of the measuring device, specifically for controlling the targeting unit and the scanning module. The scanning module is arranged on the main frame and/or on the targeting unit in such a way that the central line direction, which central line direction is in particular located at an angular average orientation in the field of view in case the scan surface is embodied as a scan plane, deviates by at most 45 degree from orthogonality with respect to the pivoting axis.

The targeting unit may comprise a first distance measuring functionality for measuring a distance to an object. As the construction may be rotated around the pivoting axis, the pivoting axis may therefore also be considered to be a rotation axis, specifically a standing rotation axis.

The scanning module is configured to acquire scan data of the surroundings of the measuring device, in particular 3D point cloud data of the surroundings.

The field of view of the scanning module relates to the case that the construction, or specifically the main frame of the construction, does not rotate or pivot about the pivoting axis. In case the construction, or specifically the main frame, is static, the scanning module emits scanning laser beams within the scan surface, which scan surface changes in case the construction, or specifically the main frame, moves.

The field of view is defined by the rotation axis around which the beam deflection element rotates, and by the orientation of the beam deflection element with respect to the rotation axis. The field of view also may be dependent on the incidence direction of a scanning laser beam impinging on the beam deflection element. In case the scanning laser beam arrives at the beam deflection element at an angle of 45 degrees with respect to the normal of the beam deflection element and in case the beam deflection element rotates around a rotation axis having an angle of 45 degrees with respect to the normal of the beam deflection element and 0 degrees (or parallel) with respect to the incidence direction of the scanning laser beam (and which rotation axis passes through a point of incidence at which the scanning laser beam impinges on the beam deflection element), the field of view of the scanning module would lie within a scan plane. In case of a changed incidence direction which differs from 45 degrees and/or a changed rotation axis, the field of view of the scanning module may not lie on a scan plane, but may instead e.g. lie on at least a part of a conical surface.

In case the beam deflection element is rotated around the rotation axis, deflected scanning laser beams would in general only be able to reach an object to be measured for certain angular orientations of the beam deflection element around the rotation axis: for other angular orientations, deflected scanning laser beams would typically be blocked by parts of the measuring device and would therefore not reach an object to be measured. The angles of the beam deflection element around the rotation axis for which deflected scanning laser beams would be able to reach an object to be measured lie in an angular field of view rotation range. The angular field of view rotation range may correspond to a compact set of rotation angles from a low rotation angle to a high rotation angle.

At a central rotation angle in the angular field of view rotation range—the central rotation angle e.g. corresponding to an geometric average angle in the angular field of view rotation range, i.e. being equal to (low rotation angle+high rotation angle)/2, or e.g. corresponding to an average angle in the angular field of view rotation range weighted by a potentially changing rotation velocity of the beam deflection element around the rotation axis—the beam deflection element deflects the scanning laser beam in a central line direction, which central line direction lies in the field of view of the scanning module.

The scanning module is arranged in such a way on the main frame that the field of view of the scanning module, i.e. the part of space which can be irradiated or imaged by the scanning module, is such that a central line with a central line direction deviates by at most 45 degree from orthogonality with respect to the pivoting axis. The central line can e.g. be provided by an angular average over the field of view. For example: if the field of view lies in a scan plane and extends over 180 degree, the central line may be located in the middle, with 90 degree of the field of view to its lower quarter circle and 90 degree of the field of view to its upper quarter circle.

Orthogonality refers to all lines which are orthogonal to the pivoting axis. Deviation by at most 45 degree from orthogonality now may be evaluated by referring to said lines orthogonal to the pivoting axis. If the central line deviates by at most 45 degree from any of said lines, the central line is said to deviate by at most 45 degree from orthogonality (if it deviates by at most 45 degree from a first orthogonal line, it generally deviates by at least 45 degree from a second orthogonal line).

The measuring device may comprise the functionalities of precise setting-up and referencing to external fix-points and may allow for stake-out of plan points, for recording dedicated object points, and for fast scanning of object surfaces.

The scanning module may be arranged on the targeting unit as well. The scanning module may be arranged in such a way on the targeting unit that—irrespective of the angular orientation of the targeting unit with respect to the targeting unit rotation axis—the central line direction in the field of view of the scanning module deviates by at most 45 degrees from orthogonality with respect to the pivoting axis. By arranging the scanning module on the targeting unit, the scan surface, in particular embodied as scan plane, may be changed by changing an angular orientation of the targeting unit about the targeting unit rotation axis.

In an embodiment of the measuring device, the scanning module is arranged on the main frame in an undetachable manner.

The scanning module may be arranged in a rigid and fixed manner on the main frame. In case that the scanning module does not pivot or rotate itself and given the rigid and fixed arrangement, a relative orientation between the scan plane and the pivoting axis does not depend on the overall orientation of the construction with respect to the pivoting axis.

Arranging the scanning module on the main frame in an undetachable manner may also improve the internal angular stability and the mechanical angular stiffness between the telescopic sighting body, i.e. the targeting unit, and the scanning module.

In a further embodiment of the measuring device, the scanning module is arranged on a first column of the at least one column of the main frame, and/or the scanning module is arranged below the targeting unit and/or is laterally displaced to the targeting unit.

The term lateral displacement may be understood to refer to a spatial displacement which is perpendicular to the pivoting axis.

A scanning module arranged accordingly may allow measuring the zenith and/or nadir of the measuring device. In case the scanning module is placed above the targeting unit, the targeting unit would block the scanning module from acquiring scan data surrounding the nadir, and other components such as a GPS antenna typically placed above the targeting unit would block the scanning module from acquiring scan data surrounding the zenith. Having the scanning module arranged on a first column, the field of view of the scanning module facing away from the measuring device, may allow acquiring scan data surrounding the zenith and nadir of the measuring device. Components such as GPS antennas, or the targeting unit itself, in this case may not influence the field of view of the scanning module. The scanning module may substantially only be restricted by the first column and the base.

In case the scanning module is laterally displaced with respect to the targeting unit—be it above, below or at a same height as the targeting unit—the scanning module may not hinder the targeting unit from targeting points on an object which is located in the direction of the zenith of the measuring device. In this case, the targeting unit may be positioned to point in a direction of the zenith of the measuring device, and the scanning module does not hinder it from doing so.

In another embodiment of the measuring device, the main frame comprises at least two columns, and a further scanning module having a further rotation axis and a further beam deflection element is arranged on the second column, and/or at least one camera is arranged on the second column.

Similar to the scanning module, the further scanning module may have a further field of view, which further field of view is within a further scan surface, in particular in a further scan plane.

In case a camera is arranged on the second column and said camera is positioned at a same height on the second column as the scanning module on the first column and in case the camera is embodied as an RGB camera, images obtained by the RGB camera may be used to color measurement data acquired by the scanning module in a substantially parallax-free manner.

In another embodiment of the measuring device, a center point of the scanning module and the targeting unit and/or a further center point of the further scanning module and the targeting unit are substantially arranged at a same height with respect to the construction.

This way, measurements carried out by the targeting unit and measurement carried out by the scanner are referenced to reference points which may at most be laterally displaced to each other.

In a further embodiment of the measuring device, the center point and/or the further center point are laterally displaced with respect to the targeting unit.

In another embodiment of the measuring device, the field of view is in a scan plane and is greater than or equal to 180 degrees, and/or a further field of view of the further scanning module, the further field of view defined by at least the further rotation axis and within a further scan plane, is greater than or equal to 180 degrees, wherein the scanning module and/or the further scanning module are arranged in such a way on the construction and/or on the targeting unit that the field of view and/or the further field of view comprise the zenith of the measuring device.

In case the field of view and the further field of view are in a scan plane or in a further scan plane, respectively, the field of view and the further field of view may each be described by two peripheral directions between which the field of view respectively the further field of view extend. The field of view may extend between a first direction and a second direction in the scan plane, and the further field of view may extend between a further first direction and a further second direction in the further scan plane. The first direction and/or the further first direction may substantially be parallel to the pivoting axis.

In another embodiment of the measuring device, the pivoting axis is in the scan plane, and/or the pivoting axis is in the further scan plane.

In another embodiment of the measuring device, the pivoting axis is parallel to the scan plane and laterally displaced to the scan plane, and/or the pivoting axis is parallel to the further scan plane and laterally displaced to the further scan plane.

In another embodiment of the measuring device, the scan plane is inclined with respect to the pivoting axis, and the pivoting axis intersects the scan plane at one intersection point and/or the further scan plane is inclined with respect to the pivoting axis, and the pivoting axis intersects the further scan plane at one further intersection point.

In a further embodiment of the measuring device, the control and processing unit is configured to synchronize operation of the scanning module and the pivoting or rotating of the construction around the pivoting axis.

The control and processing unit may be configured to synchronize rotation of the beam deflection element about the rotation axis and rotation of the construction around the pivoting axis. The synchronization may be done using hardware means, e.g. by synchronously controlling actuating means which rotate the construction around the pivoting axis and the beam deflection element about the rotation axis, or e.g. by passively synchronizing the readouts of sensors measuring an angular orientation of the construction around the pivoting axis and an angular orientation of the beam deflection element about the rotation axis. Such passive synchronization may e.g. be provided by a joint clock.

Synchronizing of the scanning module and rotation of the construction around the pivoting axis may be at least partly done using a computer program executed on the control and processing unit. Said computer program may also control operation of an optional camera on the second column of the main frame and offer calibration functionality to the inventive measuring device. The computer program may also carry out data combination of data acquired by the scanning module, the targeting unit and optionally the further scanning module or the camera. Such data combination may utilize known coordinate systems and relations between such known coordinate systems of the inventive measuring device, in particular by merging data into a local coordinate system of the measuring device. In a further embodiment of the measuring device, the beam deflection element is embodied as a deflection mirror, the deflection mirror being configured to be fully rotatable around the rotation axis, and/or the deflection mirror is mechanically attached to the scanning module at only one side of the deflection mirror, and/or the deflection mirror is mechanically fully shielded by a housing of the scanning module, a part of the housing being embodied as an opaque cover configured to let light having a frequency of the scanning laser beam through. The opaque cover may therefore be transparent for light having a frequency of the scanning laser beam, and may block light of other frequencies.

In another embodiment of the measuring device, the beam deflection element is embodied as a rotating polygon, with the beam deflection element being configured to be fully rotatable around the rotation axis with an angular span of the field of view of the emitted and received beams being at least 120 degrees, preferably 160 degrees.

In another embodiment of the measuring device, the targeting unit is configured to be rotated around the targeting unit rotation axis with a rotation frequency of at most 30 Hz, and in particular at most 10 Hz.

A conventional targeting unit may therefore be used. The measuring device may therefore correspond to e.g. a conventional total station with an attached laser scanner.

In a further embodiment of the measuring device, the control and processing unit is configured to rotate the construction fully about the pivoting axis.

In case the field of view of the scanning module is substantially only located on one side of the measuring device, e.g. only in front or only behind the measuring device, the full rotation of the construction around the pivoting axis may be required in order to acquire full 360 degree scan data with the scanning module of the measuring device.

BRIEF DESCRIPTION OF THE DRAWINGS

The system is described below in more detail purely by way of example with the aid of concrete exemplary embodiments illustrated schematically in the drawings, further advantages also being examined. Identical elements are labelled with the same reference numerals in the figures. In detail.

DETAILED DESCRIPTION

Figure 1:
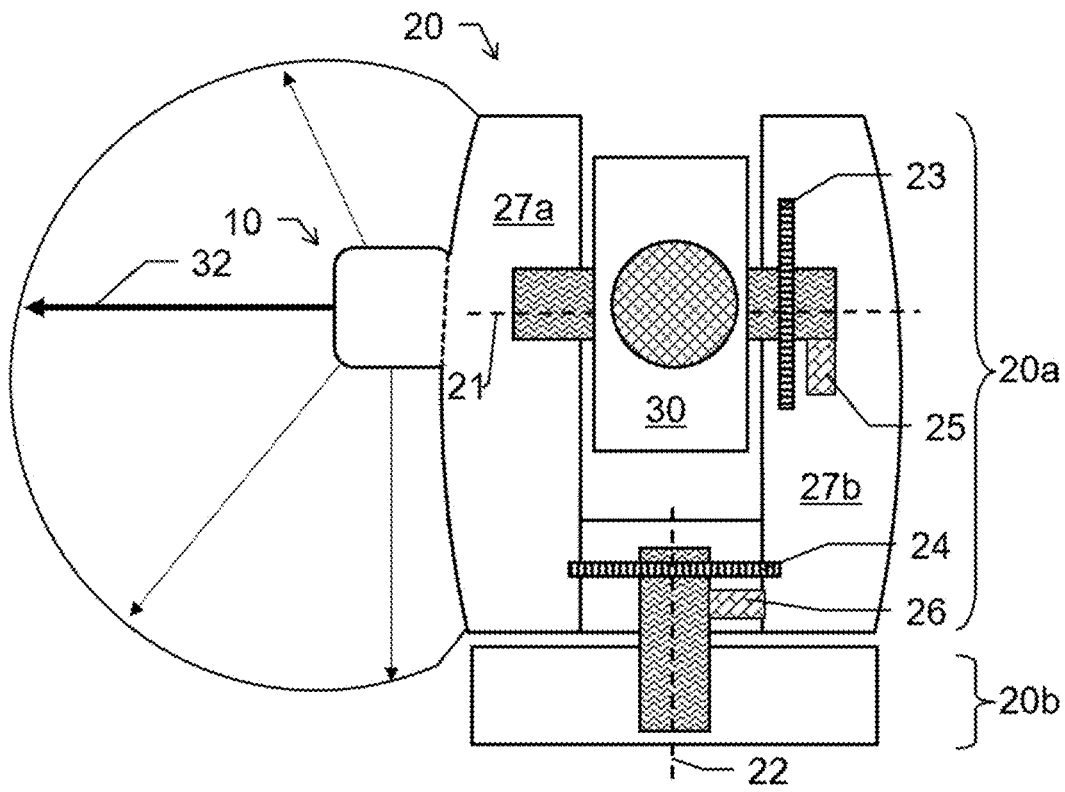
FIG. 1 shows a schematic depiction of a first embodiment of a measuring device.

FIG. 1 shows a schematic depiction of a first embodiment of a measuring device 20. The measuring device 20 comprises a base 20b and a construction 20a arranged on the base 20b. A targeting unit 30, in particular a telescope, is attached to a main frame 27a,27b of the construction 20a. The targeting unit 30 is pivotable or rotatable about a targeting unit rotation axis 21. In this case, the targeting unit 30 can be pivoted by means of a further motor 25, wherein a further pivoting angle can be measured by an angle measuring sensor 23. The main frame 27a,27b comprises a first column 27a and a second column 27b, wherein the targeting unit 30 is attached to both columns 27a,27b. A scanning module 10 is arranged on the first column 27a.

The entire upper part of the measuring device 20, i.e. the construction 20a with targeting unit 30 and scanning module 10 can simultaneously be pivoted or rotated at low speed about the vertical pivoting axis 22 relative to the base 20b of the measuring device 20. This can be brought about by a motor 26 arranged in the measuring device 20. The scanning module 10 can emit a laser beam towards a measurement point. An angle measuring functionality in the scanning module 10 can be used for determining an angle at which the laser beam is emitted. By means of the laser beam, its reflection at a surface and the acquisition by a detector in the scanning module 10, it is thus possible to carry out a distance measurement to a measurement point. The coordinates of the measurement point can be calculated from the measured distance and also from the angle at which the laser beam is emitted and a horizontal angle or pivoting angle determined by an angle sensor 24 arranged in the pivoting apparatus 20.

In case the upper part of the measuring device 20 is not pivoted or rotated about the vertical pivoting axis 22, the scanning module 10 emits laser beams within a scan plane (shown in FIG. 1) or within a more general scan surface, e.g. embodied as scan cone. Since the scanning module is arranged on the first column 27a, a field of view of the scanning module 10, i.e. the region of space which can be scanned by the scanning module 10, is substantially located at one side of the measuring device 20. In the embodiment of FIG. 1, for example, the field of view in the scan plane extends over slightly more than 180 degrees and is substantially limited by the first column 27a and the base 20b. A central line 32 is located in the field of view, the central line 32 e.g. corresponding to an angular average over the field of view, i.e. an average angle. Since the field of view of the scanning module 10 depicted in FIG. 1 substantially extends over 180 degrees in the scan plane, the central line 32 may approximately be orthogonal to the first column 27a. The central line 32 of FIG. 1 is substantially orthogonal to the pivoting axis 22.

The scanning unit 10 is positioned at a same height as the targeting unit 30 as well as being laterally displaced with respect to the targeting unit 30.

Figure 2:
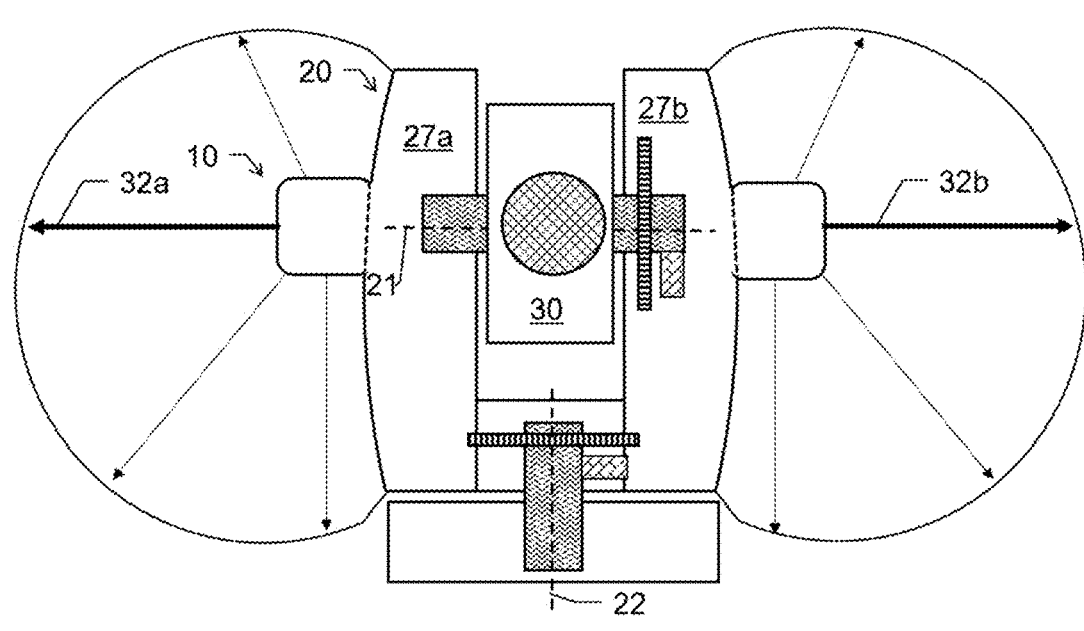
FIG. 2 shows a schematic depiction of a second embodiment of a measuring device.

FIG. 2 shows a schematic depiction of a second embodiment of a measuring device 20. FIG. 2 corresponds to the embodiment depicted in FIG. 1. In addition to FIG. 1, in FIG. 2 a further scanning module is arranged on the second column 27b, which further scanning module is located at a same height with respect to the base as the scanning module 10. The scanning module 10 has a field of view with a central line 32a, and the further scanning module has a further field of view with a further central line 32b. The further central line 32b is substantially orthogonal to the pivoting axis.

Figure 3:
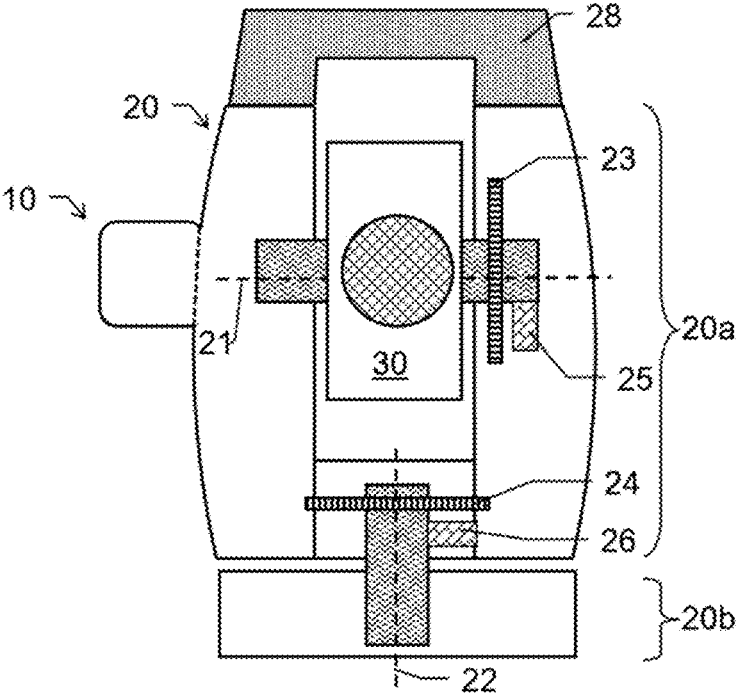
FIG. 3 shows a schematic depiction of a third embodiment of a measuring device.

FIG. 3 shows a schematic depiction of a third embodiment of a measuring device 20. A handle 28 is arranged on top of the construction 20a. The handle allows a human operator to easily carry the measuring device 20. The field of view of the scanning module 10 is basically unaffected by the handle.

Figure 4A:
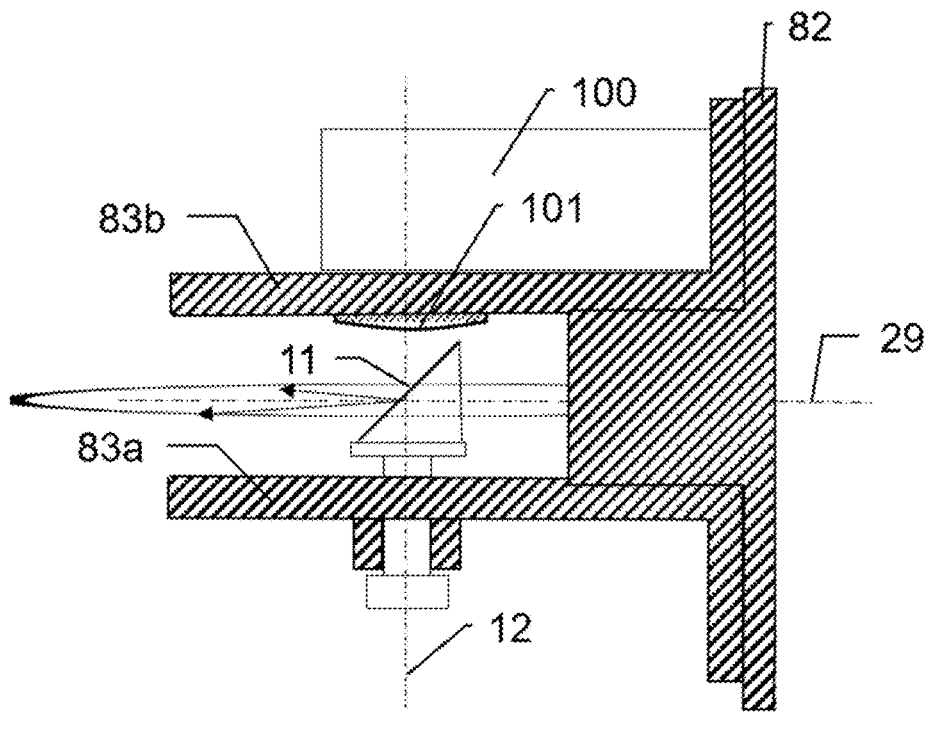
FIG. 4a shows a schematic depiction of a first embodiment of the inside of a scanning module.
Figure 4B:
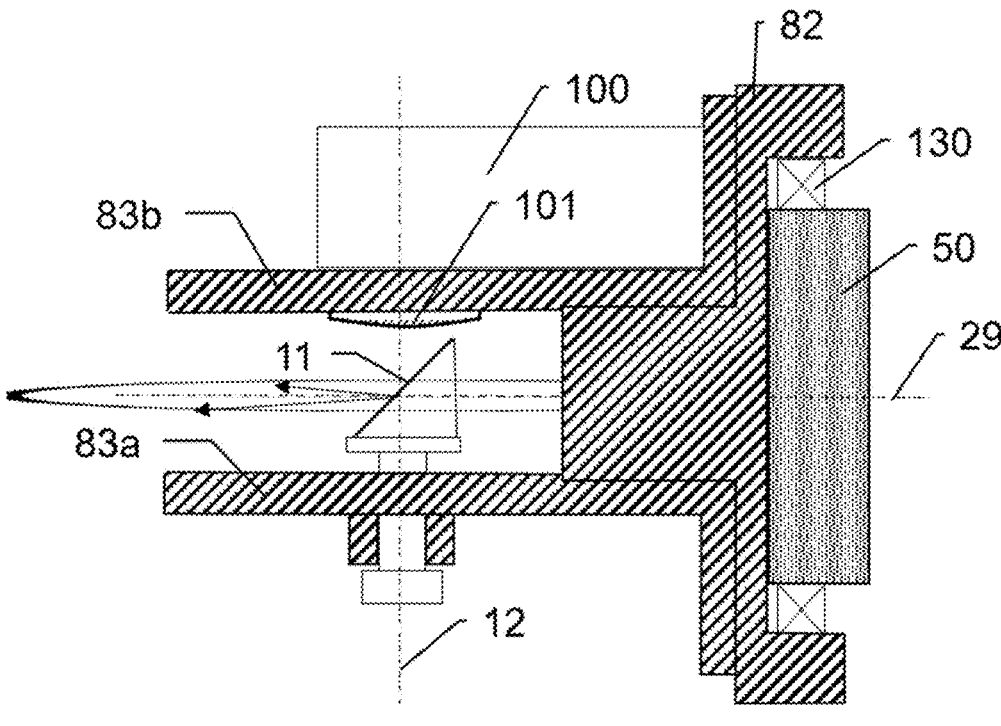
FIG. 4b shows a schematic depiction of a second embodiment of the inside of a scanning module.

FIGS. 4a and 4b show schematic depictions of different embodiments of the inside of a scanning module 10.

In FIG. 4a, the scanning module comprises a skeletal, three-part support 82,83a,83b, wherein the support here is formed by means of a skeletal structure consisting of three main parts, i.e. three support structures 82,83a,83b, which are coupled to each other, for example, by means of a mechanical connection based on normal pins.

The three-part support has a support axis 29, also termed scanning module axis, and a central support structure 82. Two further separate support structures 83a,83b may be connected to the central support structure 82. The beam deflection element 11 is arranged exclusively on support structure 83a. Depending on where the scanning module being arranged on the alhidade (i.e. construction 20a) of the surveying instrument 20, the support axis 29 may coincide with the targeting unit rotation axis 21, or the support axis 29 may differ from the targeting unit rotation axis 21, e.g. in case the scanning module 10 and the targeting unit 30 are arranged at different heights on the construction 20a with respect to the base 20b.

The beam deflection element 11 is rotatable around a rotation axis 12, which rotation axis 12 is orthogonal to the support axis 29. A current orientation of the beam deflection element 11 can be recorded by an angle measuring functionality. The current orientation can also be obtained based on a control signal used for actuating a motor rotating the beam deflection element 11. A laser beam incident on the rotating beam deflection element 11 is e.g. swept over a scan plane by the rotating beam deflection element 11. The scan plane is defined by the rotation axis 12, the orientation of the beam deflection element 11 with respect to the rotation axis 12, and by the angle of incidence of the laser beam impinging on the beam deflection element 11. The field of view, the field of view lying in the scan plane, of the scanning module shown in FIG. 4 is limited by the central support structure 82. The beam deflection element 11 is fully rotatable, i.e. it can be rotated by 360 degrees around the rotation axis 12.

A laser beam emission and detector unit 100 is arranged on support structure 83b. Outgoing and incoming light is focused by a lens 101.

The embodiment of the inside of a scanning module 10 shown in FIG. 4 can be used for the scanning module 10 shown in FIGS. 1, 2 and 3. In case FIG. 4 is embedded in one of FIG. 1, 2 or 3, FIG. 4 corresponds to a view from above, i.e. to a view from above the measuring device 20 towards the measuring device 20 along the pivoting axis 22.

In FIG. 4b, the scanning module additionally comprises a base 50. The central support structure 82 is mounted 130 on the base 50 coaxially with the support axis 29. The support structures 83a,83b are not connected to the base 50.

The central support structure 82 is mounted 130 in such a way on the base 50 that the support can be rotated around the support axis 29, in particular fully rotated. This way, the scan plane can be altered by way of rotating the scanning module 10 around the support axis 29.

The embodiments of the inside of a scanning module 10 shown in FIGS. 4a and 4b can be used for the scanning module 10 shown in FIGS. 1, 2 and 3. In case FIG. 4a or 4b are embedded in one of FIG. 1, 2 or 3, FIG. 4a or 4b correspond to a view from above, i.e. to a view from above the measuring device 20 towards the measuring device 20 along the pivoting axis 22.

A scanning module 10 has a center point which may be defined as the intersection point of the scanning rotation axis 12 with the beam deflection element 11 (e.g. a mirror surface). From this point the emitting laser beam is reflected into space versus the object surface to be scanned.

In a special embodiment, the center point of the scanning module 10 can be spatially aligned with the support axis 29 such that the center point corresponds to the intersection point of the support axis 29 and the rotation axis 12 as shown in FIGS. 4a and 4b.

Figure 5:
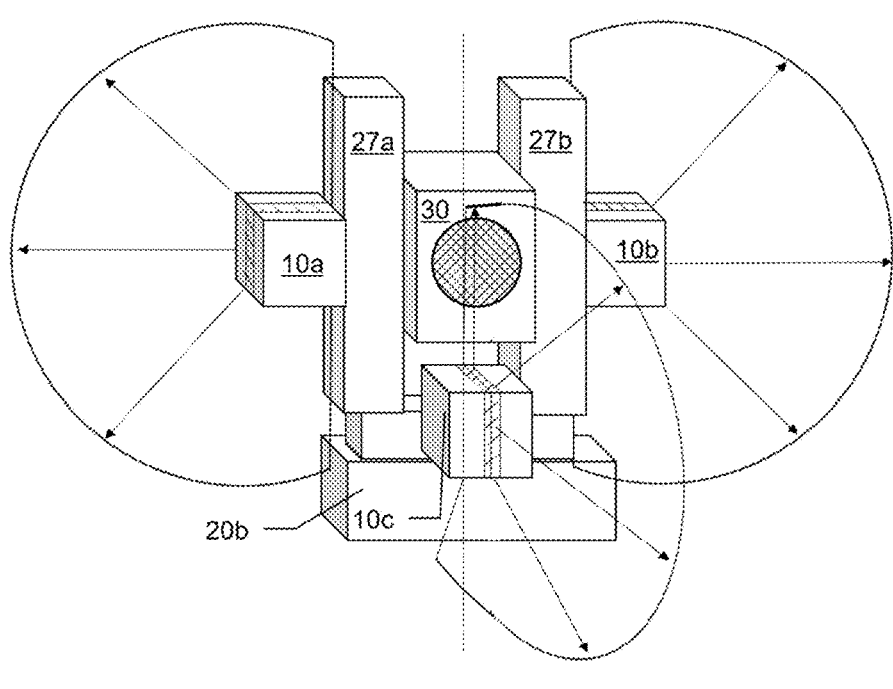
FIG. 5 shows a schematic depiction of a fourth embodiment of a measuring device.

FIG. 5 shows a schematic depiction of a fourth embodiment of a measuring device 20. The measuring device of FIG. 5 comprises three scanning modules 10a, 10b,10c. Scanning module 10a is arranged on the first column 27a and scanning module 10b is arranged on the second column 27b, while scanning module 10c is arranged below the targeting unit 30 and is laterally displaced to the targeting unit 30. Each of the three scanning modules 10a, 10b,10c has a different field of view. The scanning module 10a arranged on the first column 27a faces in the opposite direction compared to the scanning module 10b arranged on the second column 27b. The third scanning module 10c has a larger field of view compared to scanning modules 10a, 10b arranged on the columns 27a,27b since the columns 27a,27b do not limit the field of view of scanning module 10*c*. The field of view of scanning module 10*c* is substantially only limited by the targeting unit 30 and by the base 20*b*. In the embodiment of FIG. 5, a central line of scanning module 10*c*, the central line located at an angular average of the field of view of scanning module 10*c*, is therefore not orthogonal to the pivoting axis 22. The central line instead points downwards on account of the fact that the field of view of scanning module 10*c* is more restricted by the targeting unit 30 than by the base 20*b*.

Each scanning module 10*a*, 10*b*, 10*c* comprises a beam emitting region (shown hatched in FIG. 5) through which an emitted scanning laser beam leaves the scanning module. The hatched surface may be embodied as an opaque surface covering the interior of the scanning module, e.g. depicted in FIG. 4, in which interior a beam deflection element is arranged. The opaque surface may be provided by a material which is transparent to a wavelength of the scanning laser beam, and not transparent to other wavelengths.

Figure 6:
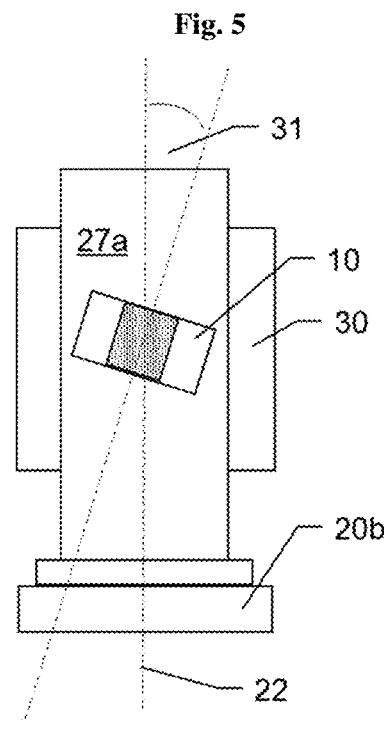
FIG. 6 shows a schematic depiction of a measuring device viewed from the side.

FIG. 6 shows a schematic depiction of a measuring device 20 viewed from the side. A scanning module 10 is arranged on a first column 27*a* of the measuring device 20. A scan beam emission region of the scanning module 10 is graphically shown in FIG. 6 in the center of the scanning module.

The scanning module 10 is tilted 31 with respect to the pivoting axis 22, i.e. a scan plane of the scanning module 10 is inclined to the pivoting axis. The pivoting axis intersects the scan plane at one point. The scanning module 10 may e.g. be tilted 31 by 45 degree with respect to the pivoting axis 22. When scanning a scene by different tilted or oblique angles, then shaded surfaces may become visible in one of the multiple scan configurations without relocation of the total station.

Figure 7:
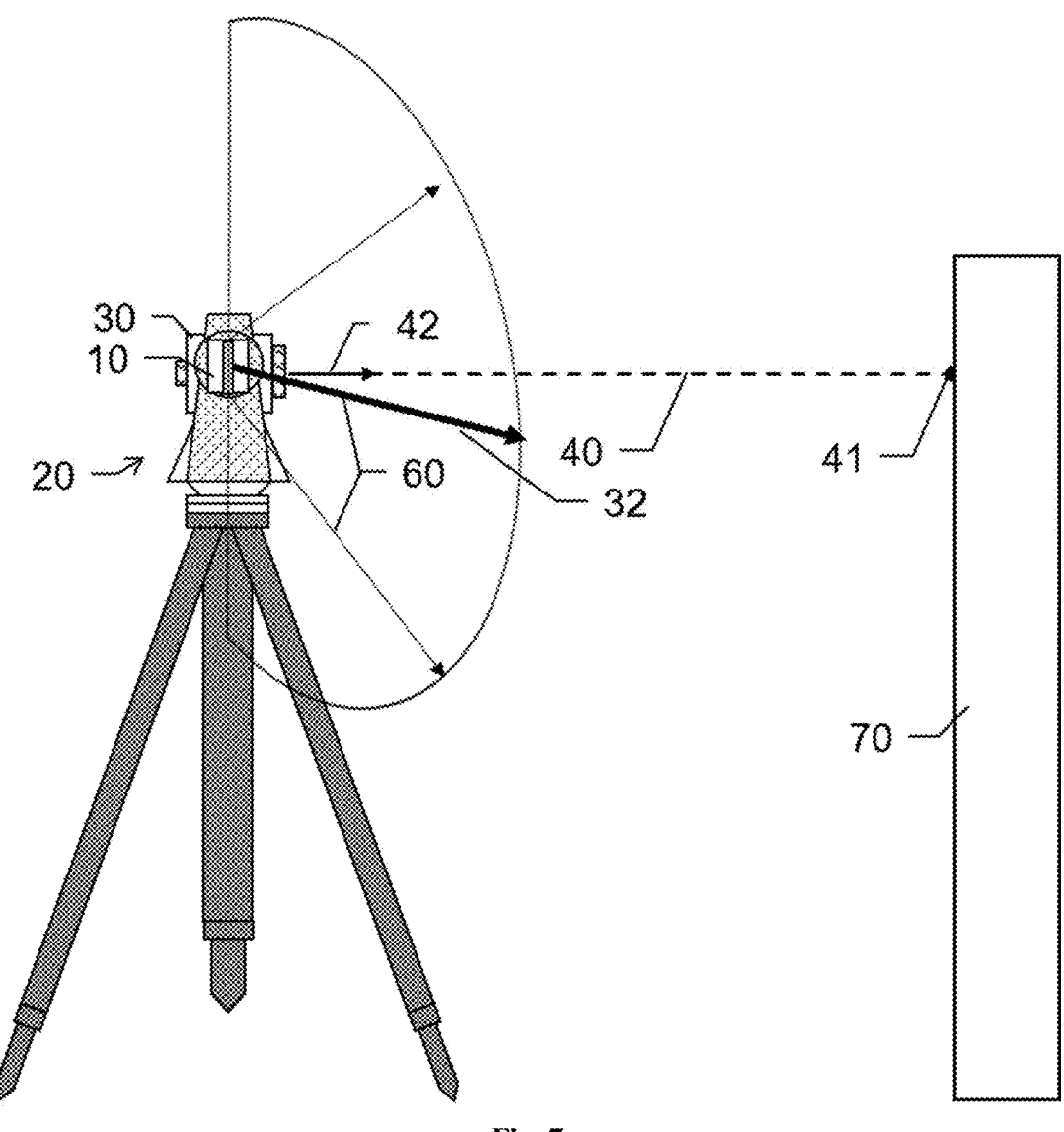
FIG. 7 shows a schematic depiction of a measuring arranged on a tripod.

FIG. 7 shows a schematic depiction of measuring device 20 arranged on a tripod. The measuring device comprises a targeting unit 30 emitting a laser beam 40 and a scanning module 10. The laser beam 40 is emitted by the targeting unit 30 in a target direction 42 towards a target point 41 on an object 70 in order to measure a distance from the targeting unit 30 to the target point 41. For high resolution scans, as already known in prior art devices, the targeting unit 30 can be scanned up and down typically at a rate below 1 Hz while the pivoting axis is continuously rotated in azimuthal direction. Such a scan, however, is slow, covers a small field of view of typically 20 deg×20 deg, and takes several minutes.

The scanning module 10 emits scanning laser beams 60 e.g. with high deflection speed of typically 100 Hz. The scanning module 10 also has a field of view with a central line 32 in the field of view, which central line is substantially orthogonal to the targeting unit rotation axis 21 of the targeting unit 30. The total scanning range of the scanning module, i.e. combined movement including rotation about the pivoting axis, may cover a full-dome horizontally 360 deg and vertically from nadir to zenith. The measurement rate of the scanning module 10 is high e.g. at 100 kPoints up to several Megapoints per second. So the measurement rate is at least 100 times faster than that of known total stations (respectively known scanning functionalities). The big benefit is that large field of view (FOV) scans can be scanned in a very short time. Even a full dome scan can be performed within one minute depending on the scan settings. Such high-speed scans are not feasible when using the targeting unit 30 for recording the point clouds.

FIG. 7 also shows that the inventive measuring device 20 offers both functionalities, firstly that of a traditional total station and secondly that of a high-speed scanner which has the potential to distribute the laser measurement dots with an adequate spacing between neighboring measurement points.

A fast scanning unit is key for realizing a point distribution over a large field of view within a short time. It has to be considered that within a fraction of a microsecond the scan-angle must be changed by more than the spot size, which is not achievable by a targeting unit of a total station.

According to an embodiment, the scanning module of the measurement device may comprise a lidar with a light source emitting measurement pulses and a receiver unit comprising a light detection circuit for detecting the return signals. The receiver circuit may e.g. comprise an aluminium-indium-arsenite-antimonide (AlInAsSb) avalanche photodiode (APD) to detect the light pulses and a pulse detection circuit which comprises a transimpedance amplifier, a voltage amplifier, an analog to digital converter (ADC) and a processing unit. APDs fabricated from AlInAsSb digital alloys have several advantages over other long wavelength APDs as InGaAs/InP, for example its high sensitivity over a wide wavelength range from 800 nm to 1600 nm or a high gain in conjunction with a low excess noise. Antimony (Sb)-based III/V materials (bulk and superlattice) are capable of meeting the bandgap requirements for making APDs in the SWIR spectral range. Sb-based APDs have great characteristics with high quantum efficiency and single carrier multiplication to deliver high signal to noise ratios. Furthermore, other material systems are also very promising for low noise short wavelength infrared avalanche photodetectors such as AlInAsSb on InP, or AlGaAsSb on GaSb, or AlAsSb on InP, or InAlAs on InP substrate.

The aforementioned receiver circuit comprising the AlInAsSb APD (or similar special-material APDs) may be used and applied not only for the measuring device, but also for and within any other type of laser scanners, such as terrestrial-laser-scanners/reality-capture-scanners (see e.g. the following products of Leica Geosystems AG: "Leica RTC360", "Leica BLK2GO" or "Leica BLK360") or aerial laser scanners.

Although aspects are illustrated above, partly with reference to some preferred embodiments, it must be understood that numerous modifications and combinations of different features of the embodiments can be made. All of these modifications lie within the scope of the appended claims.

The invention claimed is:

1. A measuring device comprising
   a base,
   a construction arranged on the base and pivotable or rotatable about a pivoting axis, the construction having a main frame with at least one column,
   a targeting unit attached to the main frame, wherein the targeting unit is pivotable or rotatable about a targeting unit rotation axis, wherein the targeting unit has at least an emission unit for emitting a first laser beam, said emission unit defining an optical target axis,
   a first angle measuring functionality for acquiring at least one pivoting angle defined by a relative pivoting position of the construction with respect to the base,
   a scanning module comprising
   a beam deflection element for deflecting a scanning laser beam, said beam deflection element being rotatable about a rotation axis in a motorized fashion, wherein the rotation axis in a received state is at a defined angle relative to the pivoting axis, and
   a second angle measuring functionality for determining a rotation angle from an angular position of the beam deflection element,
   the scanning module having a field of view defined by at least the rotation axis and an orientation of the beam deflection element with respect to the rotation axis, which field of view is within a scan surface, and wherein the deflected scanning laser beam is in the field of view in case the scanning module is within an angular field of view rotation range around the rotation axis, wherein the angular field of view rotation range comprises a central rotation angle, and wherein at the central rotation angle the beam deflection element is configured to deflect the scanning laser beam in a central line direction corresponding to a geometric average angle in the angular field of view rotation range, a control and processing unit for data processing and for control of the measuring device, specifically for controlling the targeting unit and the scanning module, wherein the scanning module is arranged on the main frame and/or on the targeting unit in such a way that the central line direction, deviates by at most 45 degree from orthogonality with respect to the pivoting axis.

2. The measuring device as claimed in claim 1, wherein the scanning module is arranged on the main frame in an undetachable manner.

3. The measuring device as claimed in claim 1, wherein the scanning module is arranged on a first column of the at least one column of the main frame, and/or the scanning module is arranged below the targeting unit and/or is laterally displaced to the targeting unit.

4. The measuring device as claimed in claim 1, wherein the main frame comprises at least two columns, and a further scanning module having a further rotation axis and a further beam deflection element is arranged on the second column and/or a camera is arranged on the second column.

5. The measuring device as claimed in claim 4, wherein the field of view is in a scan plane and is greater than or equal to 180 degrees, and/or a further field of view of the further scanning module, the further field of view defined by at least the further rotation axis and within a further scan plane, is greater than or equal to 180 degrees, wherein the scanning module and/or the further scanning module are arranged in such a way on the construction and/or on the targeting unit that the field of view and/or the further field of view comprise the zenith of the measuring device.

6. The measuring device as claimed in claim 5, wherein the pivoting axis is in the scan plane, and/or the pivoting axis is in the further scan plane.

7. The measuring device as claimed in claim 5, wherein the pivoting axis is parallel to the scan plane and laterally displaced to the scan plane, and/or the pivoting axis is parallel to the further scan plane and laterally displaced to the further scan plane.

8. The measuring device as claimed in claim 5, wherein the scan plane is inclined with respect to the pivoting axis, and the pivoting axis intersects the scan plane at one intersection point and/or the further scan plane is inclined with respect to the pivoting axis, and the pivoting axis intersects the further scan plane at one further intersection point.

9. The measuring device as claimed in claim 1, wherein a center point of the scanning module and the targeting unit and/or a further center point of the further scanning module and the targeting unit are substantially arranged at a same height with respect to the construction.

10. The measuring device as claimed in claim 9, wherein the center point and/or the further center point are laterally displaced with respect to the targeting unit.

11. The measuring device as claimed in claim 1, wherein the control and processing unit is configured to synchronize operation of the scanning module and the pivoting or rotating of the construction around the pivoting axis.

12. The measuring device as claimed in claim 11, wherein the beam deflection element is embodied as a deflection mirror, the deflection mirror being configured to be fully rotatable around the rotation axis, and/or in that the deflection mirror is mechanically attached to the scanning module at only one side of the deflection mirror, and/or in that the deflection mirror is mechanically fully shielded by a housing of the scanning module, a part of the housing being embodied as an opaque cover configured to let light having a frequency of the scanning laser beam through.

13. The measuring device as claimed in claim 12, wherein the targeting unit is configured to be rotated around the targeting unit rotation axis with a rotation frequency of at most 30 Hz.

14. The measuring device as claimed in claim 13, wherein the control and processing unit is configured to rotate the construction fully about the pivoting axis.

15. The measuring device as claimed in claim 1, wherein the beam deflection element is embodied as a deflection mirror, the deflection mirror being configured to be fully rotatable around the rotation axis, and/or in that the deflection mirror is mechanically attached to the scanning module at only one side of the deflection mirror, and/or in that the deflection mirror is mechanically fully shielded by a housing of the scanning module, a part of the housing being embodied as an opaque cover configured to let light having a frequency of the scanning laser beam through.

16. The measuring device as claimed in claim 1, wherein the targeting unit is configured to be rotated around the targeting unit rotation axis with a rotation frequency of at most 30 Hz.

17. The measuring device as claimed in claim 1, wherein the control and processing unit is configured to rotate the construction fully about the pivoting axis.

18. The measuring device as claimed in claim 17, wherein a targeting unit rotation plane is generated by the optical target axis when the targeting unit rotates about the targeting unit rotation axis, the targeting unit rotation plane thus being perpendicular to the targeting unit rotation axis, wherein the scanning module is arranged on the construction in such a way that the scanning module does not intersect the targeting unit rotation plane.

19. The measuring device as claimed in claim 1, wherein a targeting unit rotation plane is generated by the optical target axis when the targeting unit rotates about the targeting unit rotation axis, the targeting unit rotation plane thus being perpendicular to the targeting unit rotation axis, wherein the scanning module is arranged on the construction in such a way that the scanning module does not intersect the targeting unit rotation plane.

*     *     *     *     *